United States Patent [19]

Drouin

[11] Patent Number: 5,526,212
[45] Date of Patent: Jun. 11, 1996

[54] TECHNIQUE FOR GENERATING AUDIBLE SIGNALS IN A DISK DRIVE EMPLOYING A VOICE COIL ACTUATOR

[75] Inventor: David M. Drouin, Fremont, Calif.

[73] Assignee: Syquest Technology, Inc., Fremont, Calif.

[21] Appl. No.: 373,150

[22] Filed: Jan. 13, 1995

[51] Int. Cl.$^6$ .................................................. G11B 33/10
[52] U.S. Cl. ........................................ 360/137; 360/97.01
[58] Field of Search ...................... 360/137, 97.01–97.02

[56] References Cited

U.S. PATENT DOCUMENTS 5,278,718   1/1994   Kim ........................................ 360/137

Primary Examiner—John H. Wolff
Attorney, Agent, or Firm—Lyon & Lyon

[57] ABSTRACT

A disk drive employing a voice coil actuator to position a read/write head over a magnetic disk retracts the read/write head from the magnetic disk surface and passes an audio frequency alternating current through the voice coil to produce a corresponding movement in the read/write head support structure which generates an audible tone indicating the disk drive status. The alternating current waveform has a positive phase and a negative phase, with the read/write head moving toward the disk in response to one phase of the current and the read/write head moving away from the disk in response to the other phase. Audible tones of different frequencies are produced by varying the frequency of the alternating current waveform. In this fashion the disk drive generates a predetermined sequence of tones separated by silent pauses which identifies a particular disk drive status condition.

1 Claim, 10 Drawing Sheets

BEEP ERROR DECODE TABLE   [L = LOW FREQUENCY TONE,  H = HIGH FREQUENCY TONE]

| BEEP SERIES | ERROR CONDITION | ERROR DESCRIPTION |
|---|---|---|
| L L L | 1 | SPINDLE NOT AT SPEED IN TIME |
| L L H | 2 | TIMED OUT WAITING FOR GOOD_DLTS IN A ROUTINE |
| L H L | 3 | TIMED OUT WAITING FOR INDEX IN LOCK ROUTINE |
| L H H | 4 | TIMED OUT LOOKING FOR LONG TRACK ID IN |
| L L L H | 5 | BAD DISK LOCK WAITING FOR INDEX IN LOCK |
| L L H H | 6 | TIMED OUT GETTING UNPARKED |
| L H L H | 7 | GOT A SEEK ERROR IN RECAL |
| L H H H | 8 | KATG ERROR (FAILED HEADWIDTH CALIBRATION) |
| H L L L | 9 | COULDN'T FIND A DISK LOCK ON TARGET HEAD |
| H L L H | 10 | TIMED OUT WAITING FOR SERVO PULSE |
| H L H L | 11 | INTEGRATOR AVERAGING ROUTINE ERROR |
| H L H H | 12 | KLP_ADJ CALIBRATION FAILED |
| H H L L | 13 | COULDN'T FIND A DISK LOCK ON TARGET HEAD |
| H H L H | 14 | DOOR OPEN REQUESTED |
| H H H H | 15 | SPINUP ROUTINE DETECTS NO CARTRIDGE |

*FIG. 4*

TECHNIQUE FOR GENERATING AUDIBLE SIGNALS IN A DISK DRIVE EMPLOYING A VOICE COIL ACTUATOR

TECHNICAL FIELD

The present invention generally relates to a means for indicating the status of a disk drive apparatus. More particularly, the present invention is directed to the use of the voice coil actuator in the disk drive to generate audible tones indicative of disk drive status.

BACKGROUND ART

Many previous generations of disk drives employed a status indicator of some type which provided the disk drive user with messages about the operating condition of the disk drive. Frequently, the status indicator was visual in nature, and comprised one or more LEDs connected to indicate the disk drive operating state (e.g., idle, seek, read or write) or the disk drive condition (e.g., improper spindle speed, bad disk lock, open door).

Although more recent generations of fixed disk drives often eliminate these status indicators, removable disk drive systems continue to provide their users with status information independent of the host system. The removable nature of the cartridges in such systems makes user feedback valuable and important.

As disk drives are manufactured in smaller and smaller form factors, the space available for visual indicators has steadily decreased. The trend in the disk drive industry has also been toward lower overall component counts and lower product cost. Very small form factors, e.g., 1.8 inch PCM-CIA cartridge drives, are frequently placed inside a host enclosure and any conventional visual status indicator may not be readily seen by the user. As a result, there is an increasing need to develop alternative indicator technologies which can replace conventional visual status indicators.

BRIEF SUMMARY OF THE INVENTION

It is therefore at object of the present invention to provide a disk drive indicator which does not rely on visual signals to convey information about the status of the disk drive.

It is another object of the present invention to provide a disk drive status indicator which generates an audio signal to inform the user of disk drive status.

It is still another object of the present invention to provide a disk drive status indicator which utilizes the voice coil actuator and head arm assembly of the disk drive to generate a series of audible tones conveying information about the status of the disk drive.

These and other objects of the present invention are achieved in a disk drive apparatus by controlling the current flow through the voice coil actuator of the disk drive in a manner which causes audible tones to be emitted from the head arm assembly. The primary function of the voice coil actuator consists of moving the disk drive read/write heads across the surface of the disk and holding the head gap in position over the desired destination track. The motion of the voice coil actuator is in turn a function of current flow in the voice coil.

As its name suggests, a voice coil actuator is capable of producing audible tones at a wide range of audio frequencies. Even though a large number of audio frequencies may thus be present over the short duration of a track seek, no appreciable level of audible sound is emitted from the voice coil actuator under normal disk drive operating conditions. This is because the voice coil audio waveforms during repetative seeks are of short duration and occur at low duty cycles, resulting in audio signals of low frequency and low average amplitude. Conventional seek algorithms also attempt to minimize the audible noise emanating from the voice coil.

If the voice coil actuator is used in such a way that it behaves as an audio speaker, however, audio waveforms produced by the voice coil can be heard by the disk drive user. Audible audio waveforms are generated when a large amplitude current waveform is applied through the voice coil while the voice coil actuator is placed in the "parked" position. The frequency response characteristic of the voice coil actuator in the parked position may differ considerably from that observed when the actuator is not parked. Adjusting the frequency response characteristic of the voice coil actuator in the parked position consequently allows optimization of the actuator audio characteristic. The voice coil actuator is prevented from moving across the surface of the disk and possibly damaging the read/write heads and/or the media during application of the current waveform by constraining the actuator to movement over a very small range.

In this manner, the voice coil actuator acts as an audio speaker and can be made to emit any audio waveform ranging from single tones (produced with square wave current modulation) to complex speech waveforms. Audio signals generated with this method can serve as indicator of disk drive status (e.g., cartridge loaded, spinning up drive ready, eject requested, spinning down) and can warn of error conditions requiring user intervention.

BRIEF DESCRIPTION OF THE DRAWINGS

The various features, objects and advantages of the present invention will become more apparent upon consideration of the following Best Mode For Carrying Out The Invention, taken in conjunction with the drawings, wherein:

FIG. 4 is a chart showing various types of status messages which can be audibly conveyed using the present invention;

BEST MODE FOR CARRYING OUT THE INVENTION

The present invention can be incorporated in a removable cartridge disk drive apparatus with a voice coil actuator of the type disclosed in co-pending application Ser. No. 08/097,511 filed on Jul. 23, 1993 and assigned to the assignee of the instant application. Application Ser. No. 08/097,511 is incorporated by reference as though fully disclosed herein.

Figure 1A:
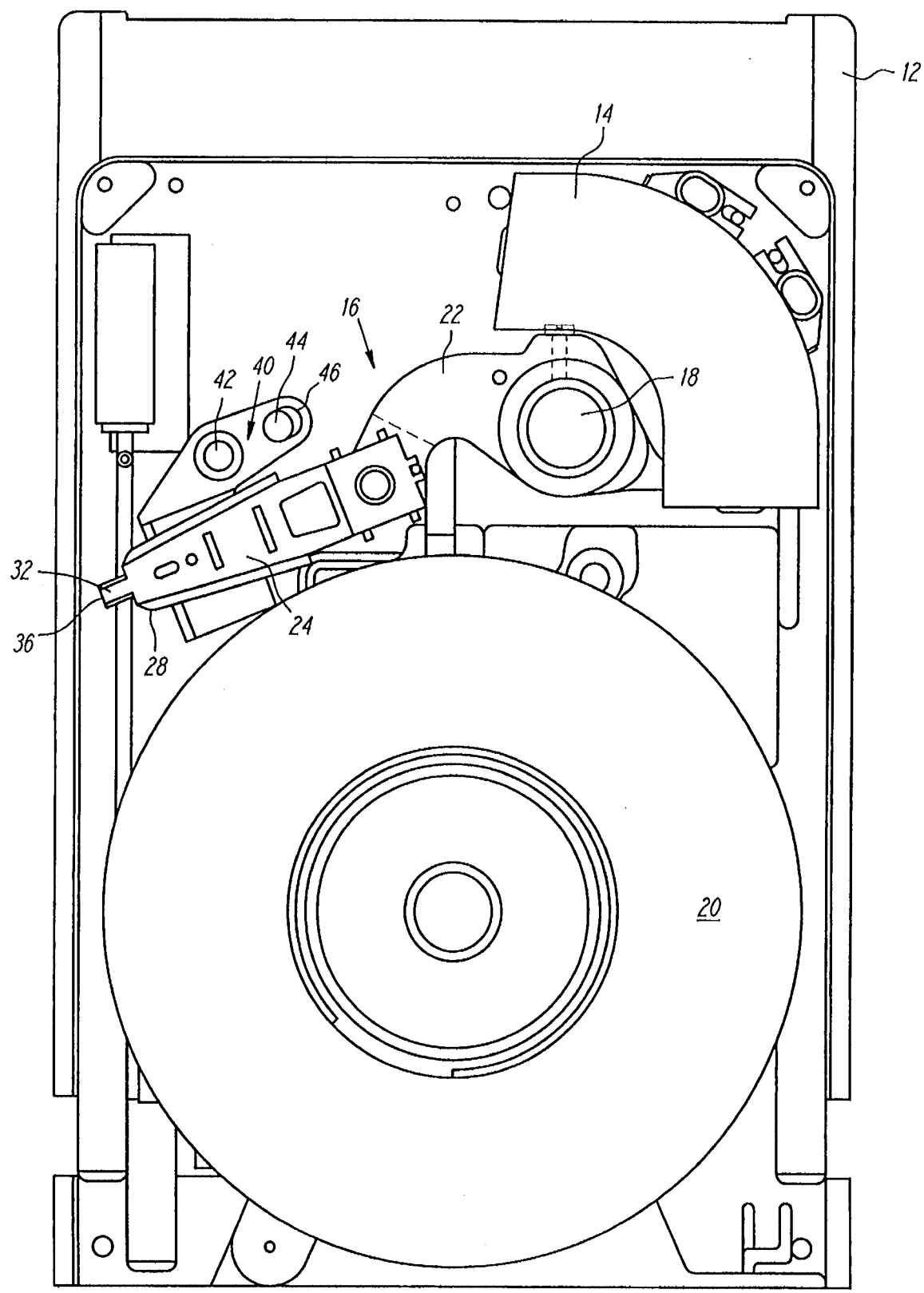
FIGS. 1A–1C illustrate the voice coil actuator and head arm assembly of a disk drive apparatus which employs the present invention.
Figure 1B:
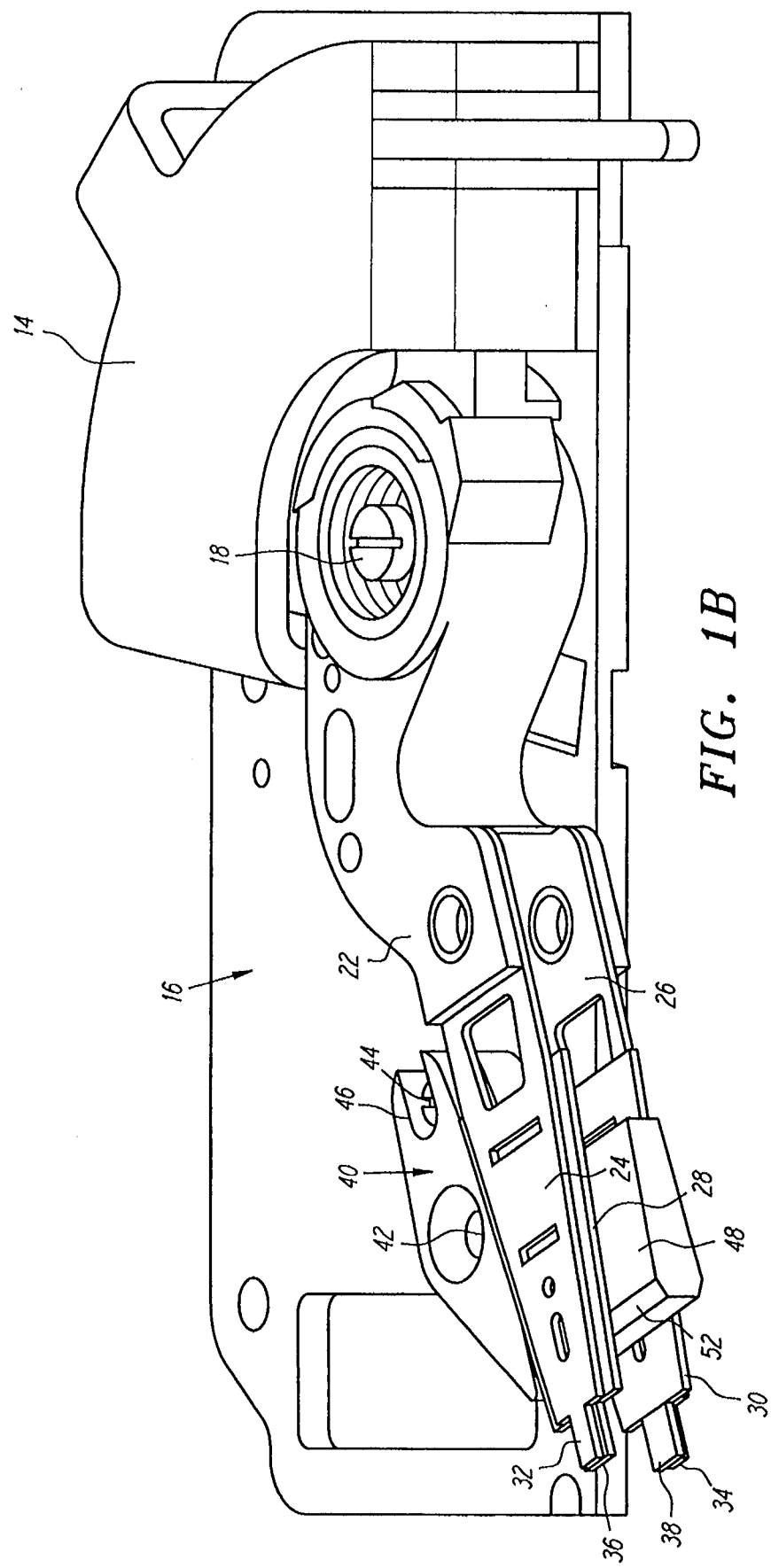
Figure 1C:
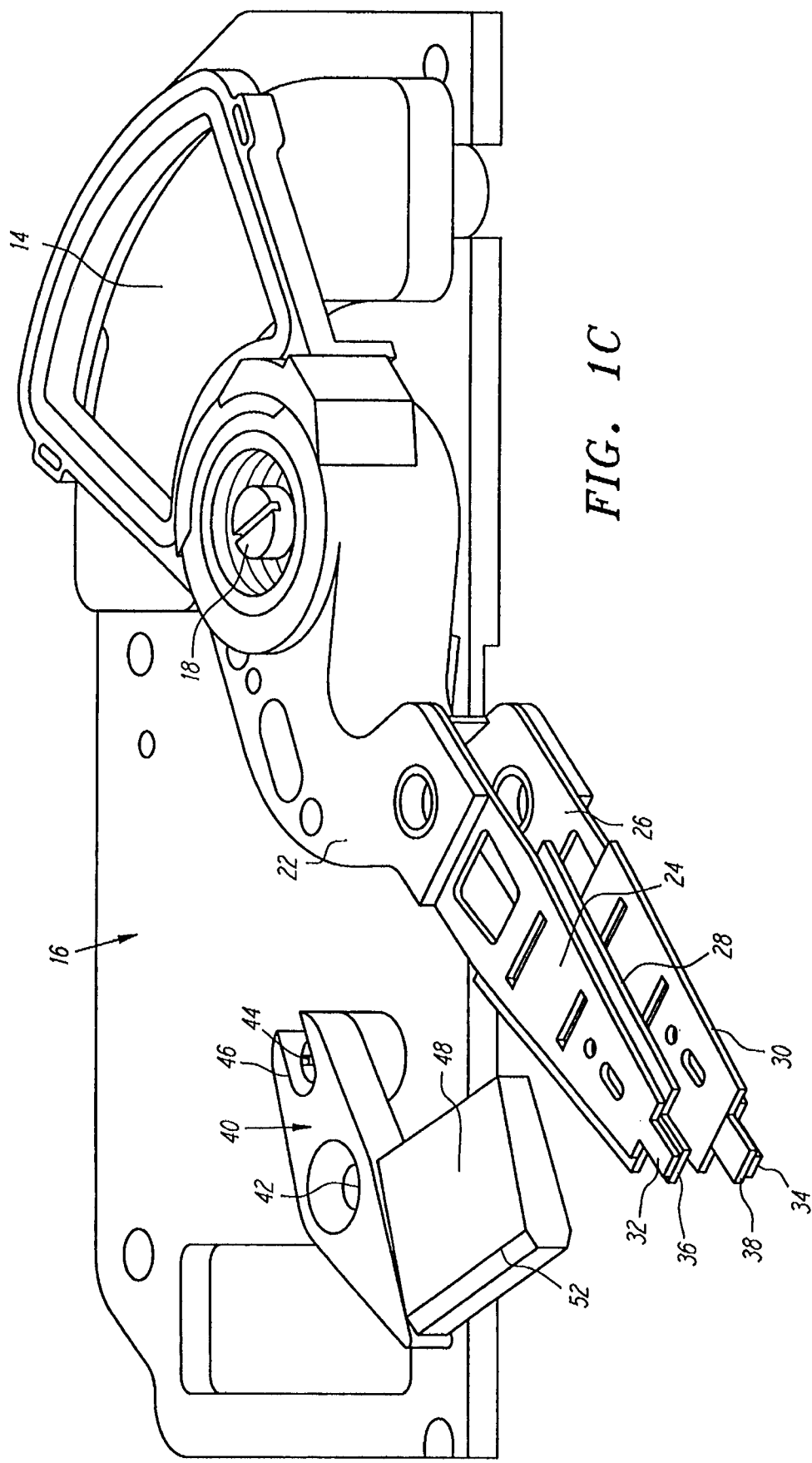

Referring first to FIGS. 1A–1C, the portions of the disk drive apparatus relevant to the present invention are depicted. The disk drive 10 includes a base 12 which supports a voice coil motor (VCM) 14. A head arm assembly 16 is pivotally mounted to the base 12 for rotation about pivot point 18 in response to the energization of voice coil motor 14 such that head arm assembly 16 can move over the surface of a disk 20 contained in a cartridge not shown) which has been inserted into the disk drive. The head arm assembly 16 comprises a bifurcated arm structure 22 to which an upper leafspring 24 and a lower leafspring 26 are attached. Upper load beam 28 and lower load beam 30 are respectively secured to upper leafspring 24 and lower leafspring 26. Gimbels 32, 34 respectively mount transducers or read/write heads 36, 38 on the free ends of leafsprings 24, 26.

During normal disk drive power-down conditions, the upper and lower load beams 28, 30 of head arm assembly 16 rest on a head parking ramp 40. When the disk drive is powered up and disk drive read and write operations begin, the voice coil motor 14 causes the head arm assembly 16 to rotate as seen in FIG. 1C, whereby the upper and lower load beams 28, 30 slide off the head parking ramp 40 and the read/write heads 36 and 38 are loaded onto the disk 20. Head arm assembly 16 subsequently moves freely under the influence of voice coil motor 14. When the disk drive is powered down, head arm assembly 16 is retracted from disk 20 and the upper and lower load beams 28, 30 are rotated back onto head parking ramp 40 to park the read/write heads, as seen in FIG. 1B.

Figure 2:
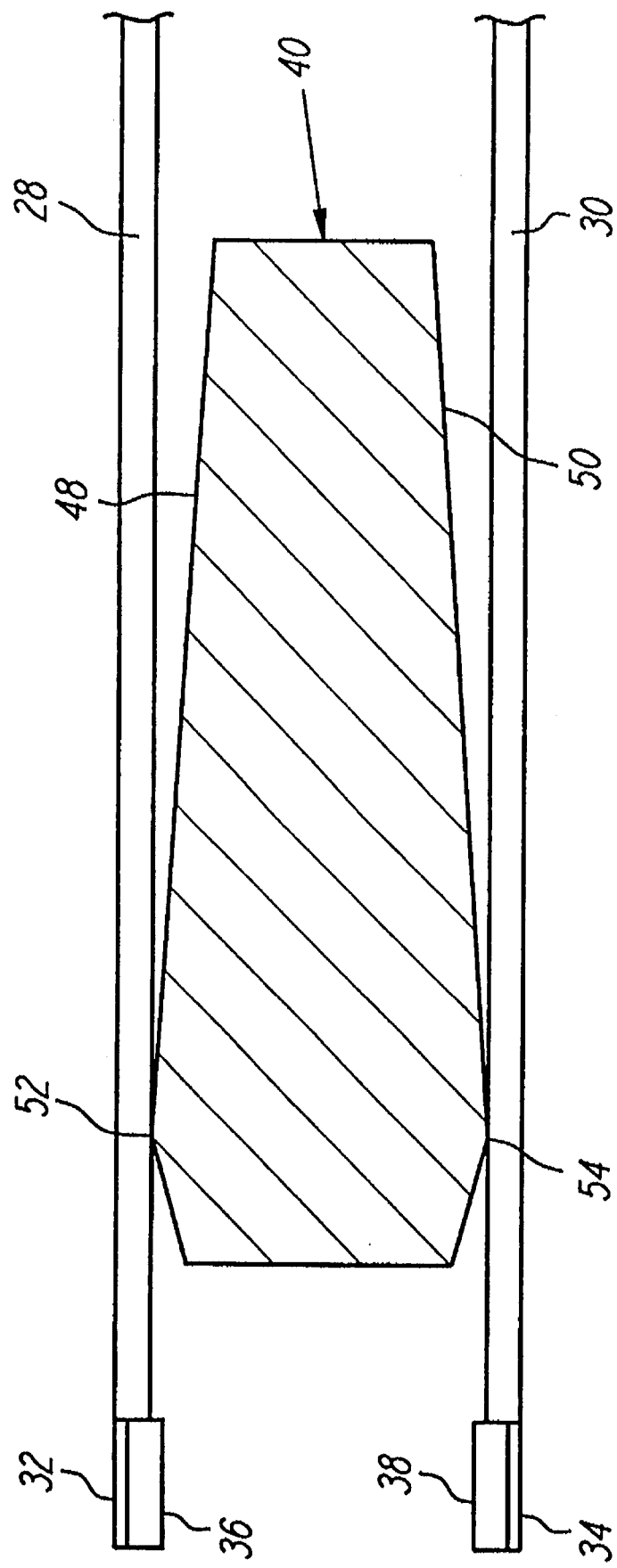
FIG. 2 cross sectional view of the read/write heads in the head arm assembly of FIGS. 1A–1C, showing the heads in their parked position.

Referring now to FIG. 2, the head parking ramp 40 will be described in greater detail. Head parking ramp 40 is secured to the base 12 of disk drive 10 by appropriate fastening means at point 42. A pin 44 upstanding from the base is received in a slot 46 of the head parking ramp 40. An upper head loading surface 48 and a lower head loading surface 50 respectively receive the upper and lower load beams 28, 30. In a preferred embodiment of the present invention, the upper and lower head loading surfaces 48 and 50 respectively terminate in landing ridges 52 and 54, and extend downwardly therefrom at approximately a 2.74° slope. In the position with head arm assembly 16 fully retracted on head parking ramp 40, landing ridge 52 supports upper load beam 28 at a location nearly adjacent to gimble 32 and read/write head 36, while landing ridge supports lower load beam 30 at a location nearly adjacent to gimble 34 and read/write head 38. Complete details of the head loading and retraction operations can be found in co-pending application Ser. No. 08/097,511.

It should here be noted that the present invention relates to use of the voice coil motor 14 and head arm assembly 16 to generate audio signals while the head arm assembly 16 is in its fully retracted position with upper and lower load beams 28, 30 respectively resting in a parked position on the landing ridges 52, 54 of the head parking ramp 40.

Figure 3A:
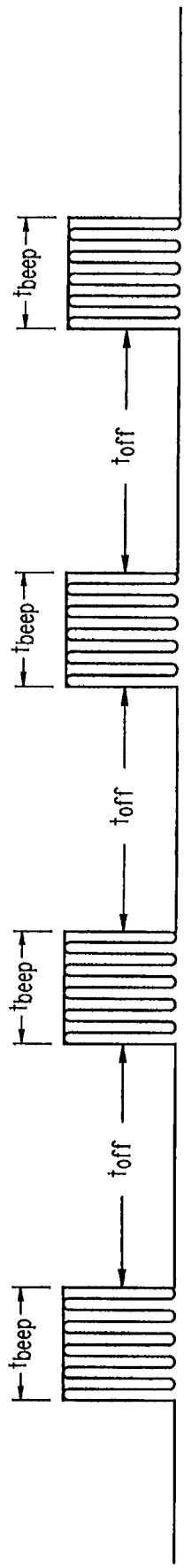
FIG. 3A depicts the audio waveforms generated by applying current to the voice coil actuator to vibrate the read/write heads accordance with the present invention.

The operation of the voice coil actuator for generation of audio tones will now be described. In the preferred embodiment of the present invention, the disk drive error conditions are indicated by a series of four beeps reflecting a 4-bit binary code whose values depend upon the particular error condition. Each beep is either a high-pitch tone or a low-pitch tone respectively representing a 1 or ∅ in the binary code. The length of each beep is a constant set by the firmware. This is shown as $t_{beep}$ in FIGS. 3A and 3B. Except for the last beep in the sequence, a delay (silence) of fixed duration is inserted after each beep and before the next beep begins. This is shown as $t_{off}$ in FIG. 3A.

Figure 3B:
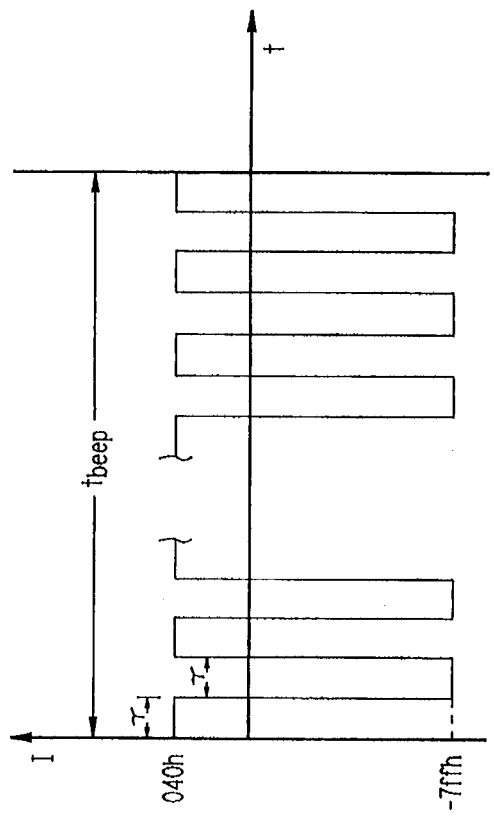
FIG. 3B depicts the current waveform applied to the voice coil actuator in order to generate the audio waveforms of FIG. 3A.

When the head arm assembly 16 is initially in the parked position of FIG. 2, a beep is generated when the firmware directs through VCM 14 a current flow of the form shown in FIG. 3B. The values given for the current amplitude are DAC constants. In the preferred embodiment of the present invention, a neutral VCM has DAC value of zero. Values greater than zero through VCM 14 apply force on the head arm assembly 16 toward the inside diameter of the dish drive. Values less than zero apply force toward the outside diameter. For any one cycle of the rectangular waveform shown in FIG. 3B, the positive half is equal in duration to the negative half. This is shown as the half-period $\tau$ in FIG. 3B. For a beep with low tone, $\tau$ is a constant set by the firmware, while for a beep with high tone $\tau$ is shorter but also a constant.

When positive current flows through the VCM, the upper and lower load beams 28, 30 and associated leafsprings 24, 26 are driven from landing ridges 52, 54 and down the sloped head loading surfaces 48, 50 towards disk 20. When negative current flows through the VCM, upper and lower load beams 28, 30 are driven back up the sloped head loading surfaces 48, 50 toward their parked position on landing ridges 52, 54. The rapid movement of load beams 28, 30 back and forth along the head loading surfaces 48, 50 and landing ridges 52, 54 create audible tones. As shown in FIG. 3B, the negative current has a much greater amplitude than the positive current. This is to insure that the read/write heads 36, 38 never move off the head parking ramp 40 onto the surface of disk 20 during the tone-generating operation, thereby avoiding damage to either the disk or the heads.

FIG. 4 shows the disk drive status/error conditions for the preferred embodiment of the present invention. Assume now that error condition number 1 is to be implemented. This requires a series of four beeps to be generated in succession, namely L, L, L, H, where L indicates a low tone and H indicates a high tone. In this example, after the first low tone beep is generated as described above, the firmware directs zero current through the VCM 14 to maintain upper and lower load beams 28, 30 of head arm assembly 16 at their parked positions on landing ridges 52, 54 of head parking ramp 40 so that no tone is generated. For error condition number 1 here, the second beep in the sequence is a low tone beep. The third is low tone and finally, the fourth is high tone. As explained above, the delay $t_{off}$ between each beep is constant. After the last beep in the sequence has been sounded, the firmware disables the VCM driver so that no tone is generated.

Figure 5:
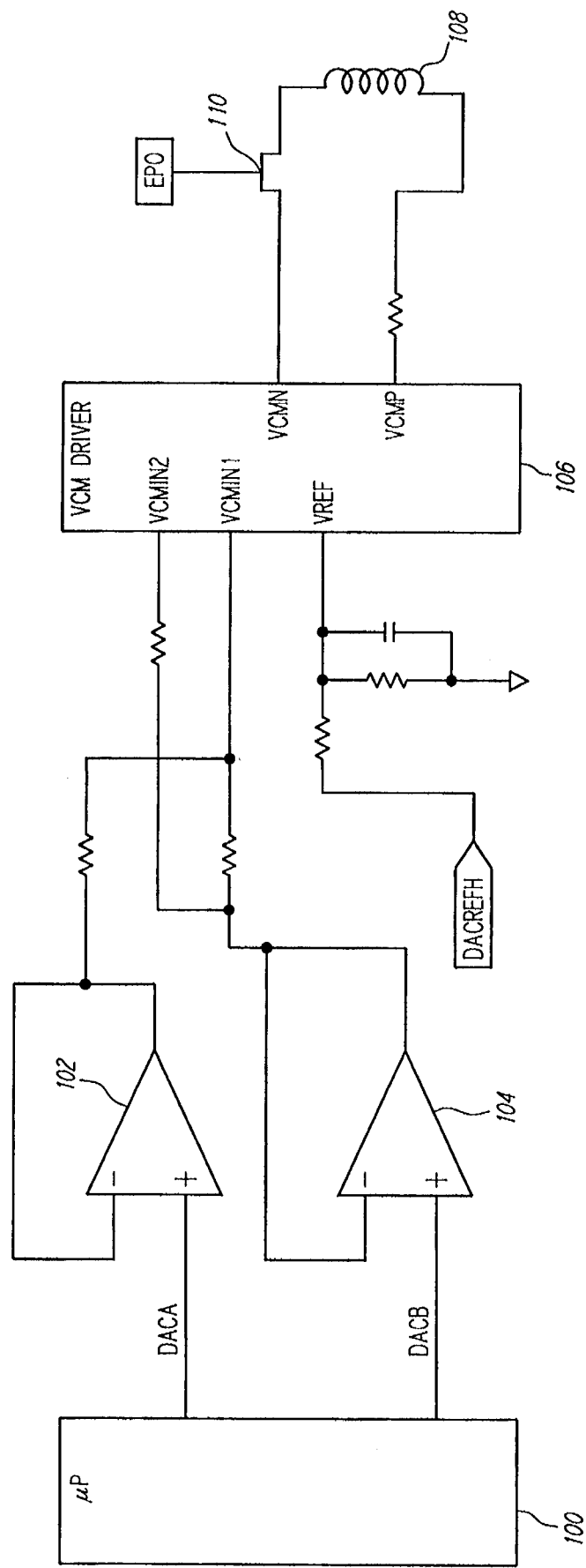
FIG. 5 is a circuit diagram of the microprocessor and voice coil actuator of the disk drive apparatus which employs the present invention.

FIG. 5 is a circuit diagram of the disk drive electronics required to carry out the present invention. The electronics include a microprocessor 100 which executes the algorithm described below to generate DAC values. The DAC values are used to generate an out put voltage which is supplied from microprocessor 100 through buffers 102 and 104 to the VCM driver 106. In a preferred embodiment of the present invention, VCM driver 106 is a VCM and spindle motor driver manufactured by Philips. The output of VCM driver 106 comprises the current waveform of FIG. 3B. This current waveform passes through the VCM coil 108 of VCM 14 to generate audible tones. Gate 110 is placed in the VCM coil circuit and driven by a control signal which acts to remove the VCM coil from the driver whenever the sequence for retracting the read/write heads from the disk is initiated.

Figure 6A:
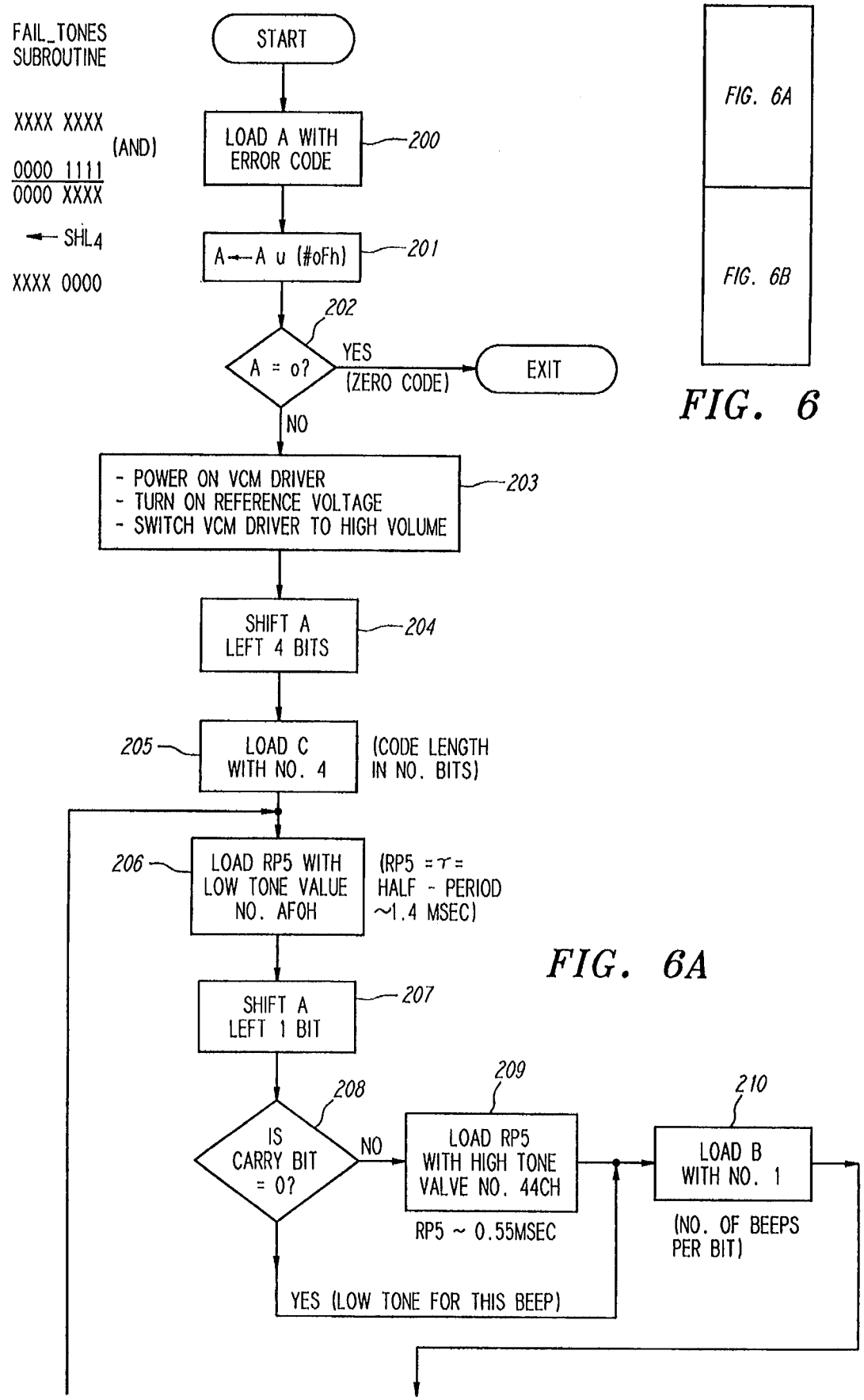
FIGS. 6A and 6B comprise the flow chart for the algorithm used to control current flow through the voice coil actuator in order to generate audio waveforms in accordance with the present invention.
Figure 6B:
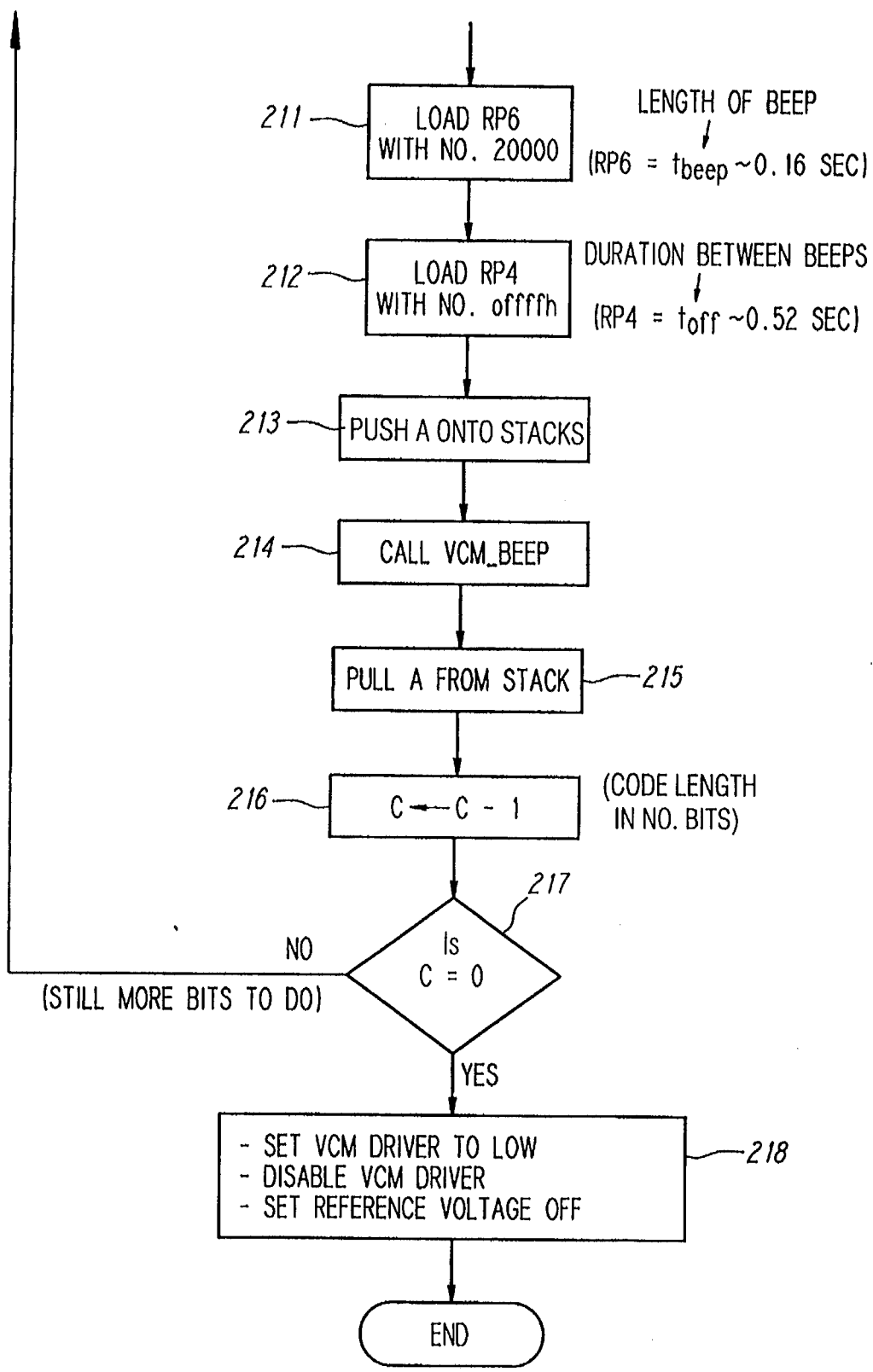
Figure 7:
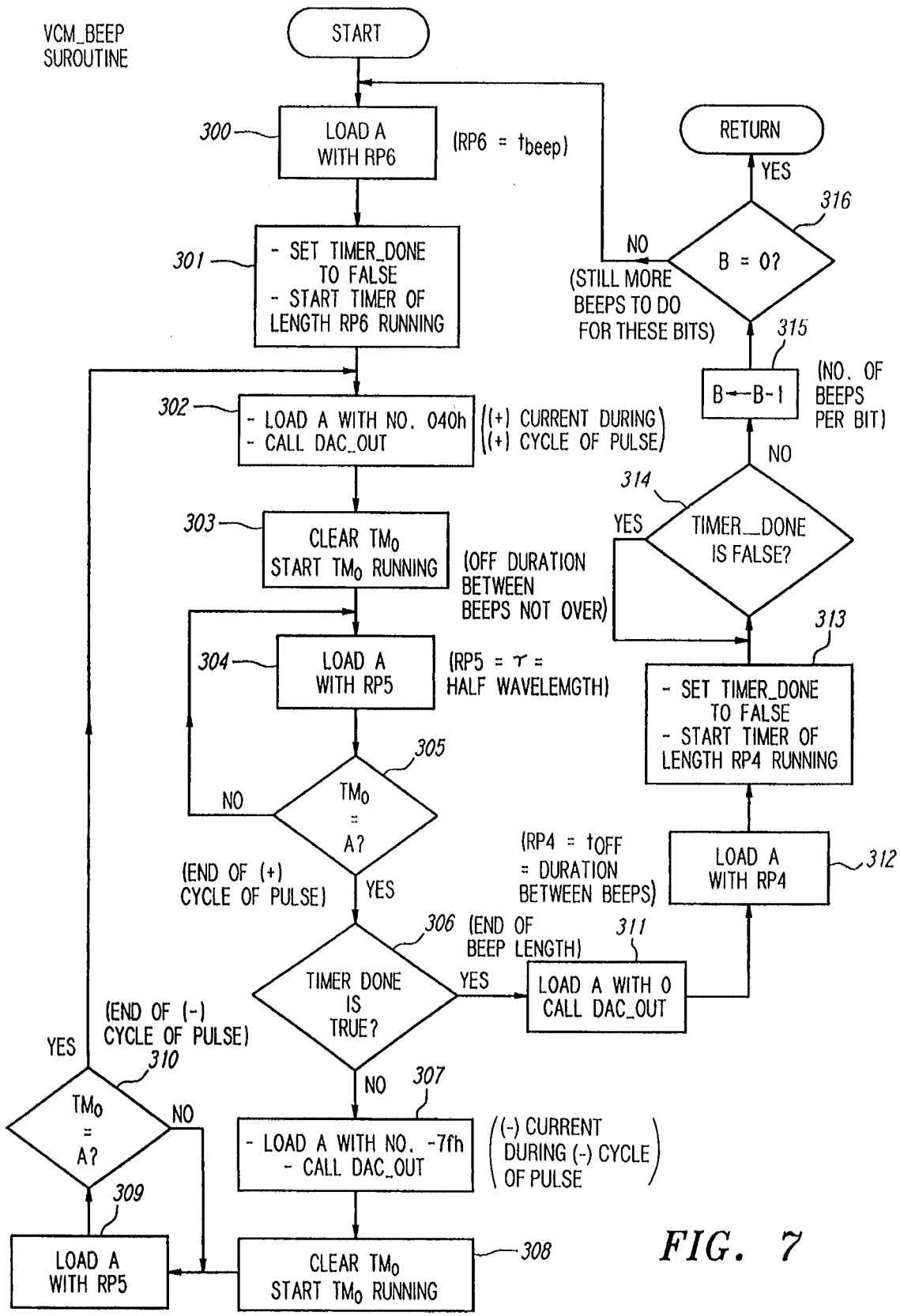
FIG. 7 comprises a flow chart for the microprocessor subroutine which is actually responsible for generating tones in the algorithm of FIGS. 6A and 6B.

Referring now to FIGS. 6A, 6B and 7, the preferred software algorithm to control the generation of tones will be described. Microprocessor 100 is used to implant the algorithm in the preferred embodiment. The main subroutine FAIL_TONES in FIGS. 6A and 6B is described first. At step 200, shift register A is loaded with the particular error code indicating the disk drive condition. Next, at step 201, the content of register A is ANDed with the value 0FH and the result is stored back in register A. A decision is made at step 202 based on the content of register A. If register A is zero then the error code loaded in register A at step 200 was zero, and the algorithm is discontinued. If not, than at step 203, the VCM driver 106 is turned on and set to high gain in preparation for tone generation, and the reference voltage to the DAC is turned on. The content of register A is then shifted left by four bits at step 204.

Next, at step 205, register C is loaded with the value 4, which represents the bit length of the error code. Then, at step 206, register RP5 is loaded with a value representing the half-period of a low tone, or τ. In the present embodiment, the value AFØH (28Ø decimal) is used, which is about 1.4 msec where each unit is Ø.5 μsec. Since the half-period is 1.4 msec, the frequency of the low tone, as used in the present embodiment, is 1/(2*RP5)=357 Hz.

Next, at step 207, register A is shifted left by one bit so that the most significant bit of the error code is now the carry bit. The carry bit is then tested at step 208. If the carry bit is zero, then for this particular error code bit, the beep will be a low tone and the next step is step 210. If the carry bit is not zero, then the beep will be a high tone, and the next step is step 209. At strap 209, RP5 is reloaded with the value for the half-period of a high tone. In the present embodiment, this value is 44CH (11Ø decimal), which is about Ø.55 msec. The frequency of the high tone is thus about 9Ø9 Hz. At step 210, register B is loaded with the value of 1, which represents the number of beeps per error code bit in the present embodiment.

Referring now to FIG. 6B, at step 211, register RP6 is loaded with a value representing $t_{beep}$, which in the present embodiment is 20,000 decimal or 0.16 sec. Next, at step 212, register RP4 is loaded with a value representing the duration between beeps, or $t_{off}$, which in the present embodiment is 0FFFFH (65,535 decimal), or about 0.52 sec. At step 213, the content of register A, which contains the remaining error code bits, is pushed onto the stack to be saved for future reference in preparation for entry into the subroutine $VCM_{13}$ BEEP. At step 214, $VCM_{13}$ BEEP is executed.

Referring now to FIG. 7, the operation of subroutine $VCM_{13}$ BEEP will be described in detail so that a logical flow is achieved. At step 300, the working register A is loaded with the content of register RP6, which is $t_{beep}$ (see step 211 above). Then, at step 301, the $TIME_{13}$ DONE flag is set to FALSE and a timer of length RP6 is set running. When this timer is finished, the $TIMER_{13}$ DONE flag will be set to TRUE. Continuing at step 302, register A is now loaded with the DAC constant for positive current (040H). This value is written out to the DAC by the subroutine $DAC_{13}$ OUT so that a positive current flows through the VCM. At step 303 a separate timer TM0 is first cleared, then is set running. Next, at step 304, register A is loaded with the content of register RP5, which is the half-period of the particular tone being generated, or τ. Meanwhile, timer TM0 is running and its value is compared with register A at step 305. If TM0 is not yet equal to A, then the program loops back to step 304 to do the comparison again as TM0 continues to run. When TM0 equals A, this signifies the end of the positive current phase through VCM 14. Therefore, this phase has lasted for a length of τ.

Continuing with step 306, the TIMER_DONE flag is checked to see if the timber of length RP6 is finished. If it is, the flag TIMER DONE is set to TRUE which signifies the end of the beep, and step 311 is next. If not, TIMER_DONE is still FALSE, and step 307 is reached. In step 307, register A is loaded with the DAC constant for negative current (−7 FH), and this value is written out to the DAC so that a negative current flows through the VCM. At step 308, the separate timer TM0 is once again cleared, then is set running. At step 309, register A is loaded with the content of register RP5. As timer TM0 runs, it is compared with the value of A at step 310. If TM0 does not equal A, the program loops back to step 309 where RP5 is reloaded into A, and the comparison is done again. Note that the length of the negative phase is the same as that of the positive phase, i.e., τ. When, at step 310, TM0 equals A, this signifies the end of the negative current phase. At this point, one complete cycle of positive and negative current has flowed through the VCM, and the program loops back to step 302 to begin a new cycle.

Turning now to step 306, after the cycles of the current waveform required to generate the beep have been completed a point is reached when the free-running timer with length RP6 of step 301 finally runs down and the TIMER_DONE flag is set to TRUE. The beep is consequently finished and zero current is directed through VCM 14 so that no sound is generated. This is done in step 311. Next, at step 312, register A is loaded with the content of register RP4, which represents $t_{off}$. At step 313, the TIMER_DONE flag is set to FALSE and a timer of length RP4 is set running. When this timer is finished the TIMER_DONE flag will be set to TRUE. Before that happens step 314 continuously tests the value of the flag. When TIMER_DONE is true, step 315 is reached. In step 315, the value of register B, which contains the number of beeps per error code bit, is decremented by one. In the present embodiment register B is initially set to one (see step 210 above), whereupon register B will equal zero at the first execution of step 316 and the subroutine is exited. Alternative embodiments of the present invention, however, may have register B initially set to values greater than one. In those cases, register B will not equal zero when step 316 is first executed and the program loops back to step 300 at the beginning of the subroutine. Thus, still more beeps are generated for the same error code bit.

Referring back to FIG. 6B, after the program exits $VCM_{13}$ BEEP, it reaches step 315. In this step, the remaining error code bits are pulled from the stack and into register A. At step 216, the value of register C, which contains the number of error code bits, is decremented by one. At step 217, the value in register C is tested. If it does not equal zero, then more error code bits remain to be processed, and the program loops back to step 206 in FIG. 6A to continue. If register C equals zero, then at step 218, the VCM driver is set to low gain and disabled, and the reference voltage is turned off.

From the preceding description, it will be obvious to one of ordinary skill in the art that parameters such as $t_{beep}$, tone pitch, and $t_{off}$, can be easily modified. Although in the preferred embodiment of the present invention, each error code has four bits, it is readily seen that more bits can be used. In addition, the number of beeps per bit can be changed when more complex error codes are desired. An alternate error code encoding scheme can also be employed. Since VCM 14 can be made to emit any audio waveform, other complex waveforms can be formed including speech. For example, the voice coil can be made to voice the trademark or name of the product.

The present invention has been set forth in the form of a preferred embodiment. It is nevertheless intended that modifications to the audio status indicator disclosed herein, including use of the audio status indicator with a fixed disk drive as opposed to a removable cartridge disk drive, may be made by those of ordinary skill in the art without departing from the scope and spirit of the present invention. Moreover, such modifications are considered to be within the purview of the appended claims.

I claim:

1. A method for indicating the condition of a disk drive apparatus which utilizes a coil-driven actuator to move a structure supporting at least one read/write transducer head for positioning the head over the surface of a magnetic media during disk drive read and write operations, said method comprising the steps of:

moving the head to a position radially adjacent the magnetic media; and supplying current to the coil of the actuator in an alternating fashion at a frequency within the audio range to produce a corresponding movement in the structure supporting the transducer head, said movement serving to generate at least one audible tone which can be used to signal the condition of the disk drive.

* * * * *